United States Patent Office 3,004,447
Patented Oct. 17, 1961

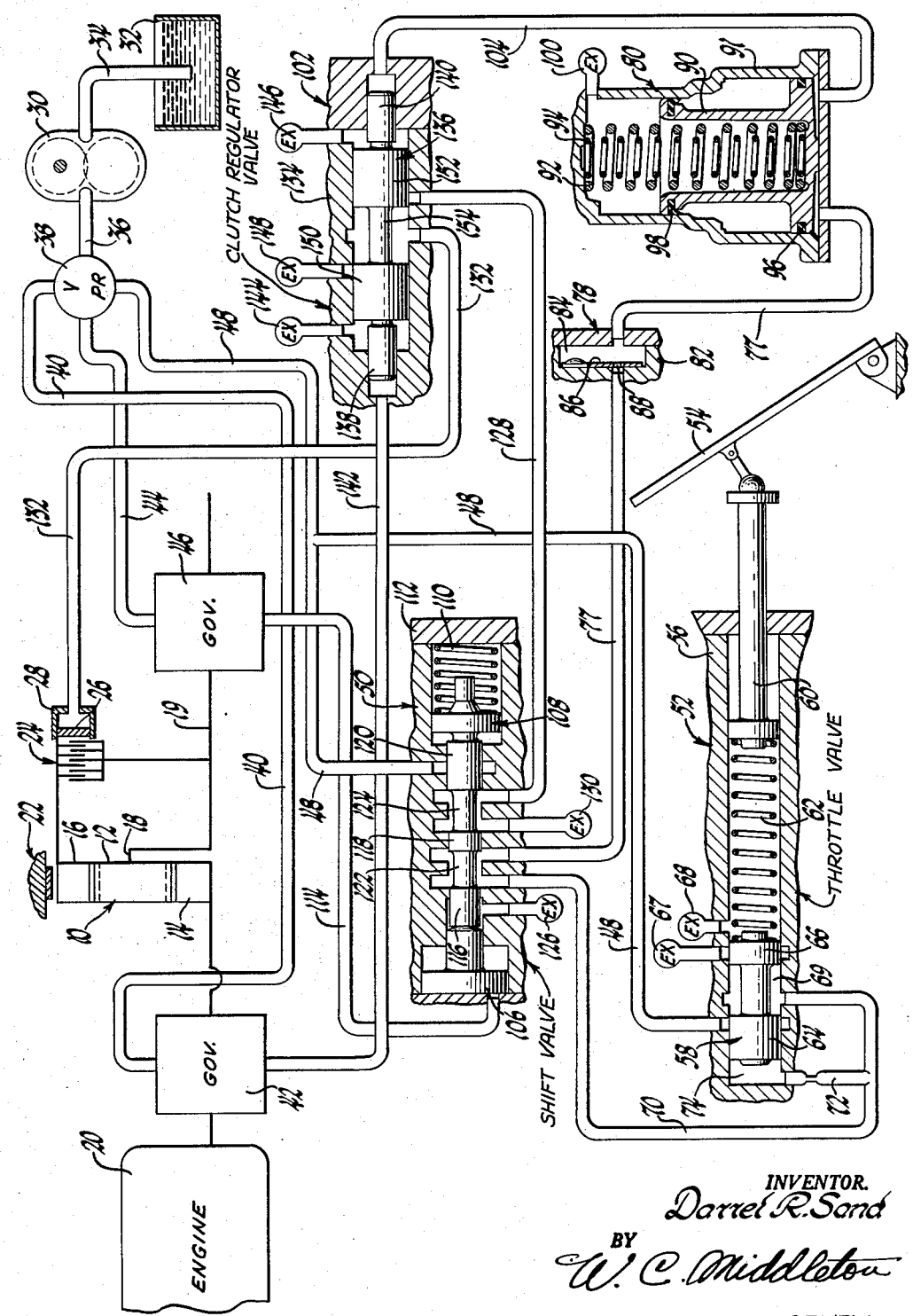

3,004,447
TRANSMISSION CONTROL DEVICE
Darrel R. Sand, Plymouth, Mich., assignor to General Motors Corporation, Detroit, Mich., a corporation of Delaware
Filed Oct. 16, 1956, Ser. No. 616,304
16 Claims. (Cl. 74—472)

This invention relates to transmissions and particularly to control devices for varying engagement rates of torque transmitters for transmissions.

In transmissions it is desirable that changes in speed ratios be accomplished smoothly with a minimum of discernment by the operator. During a normal shift either up or down, the engine speed should change at some predetermined rate while a torque transmitting means is being engaged or disengaged. For instance, if a direct drive clutch is to be engaged as the transmission upshifts, then the rate of engagement should be such that engine speed decreases smoothly. If the clutch is engaged too abruptly, the engine speed will decrease rapidly resulting in a jerking, noisy shift. On the other hand, if the clutch engagement is too slow, engine speed will not decrease properly and may increase. The operator then feels a slipping shift which takes considerable time for completion with a loss or waste of engine power in addition to the wear resulting from a slipping shift and the objectionable sensations to the operator.

Another important consideration is that among otherwise identical torque transmitters there is a variation in engaging characteristics due mainly to manufacturing tolerances; that is, several transmissions employing identical torque transmitters may all engage or disengage differently due to the dimensional variations of the various components. Also, after continued usage, wear will change the engaging characteristics.

With these considerations in mind it is a primary object of this invention to provide a control device for regulating the rate of engagement of a torque transmitting means to provide a smooth engagement.

Another object of the invention is to provide a control device for controlling the rate of engagement of a torque transmitting means according to variations in rate of change in speed of a driving means from a predetermined desired rate.

Another object of the invention is to provide a means for establishing an optimum or preferred rate of engagement for a torque transmitting means by correlating the speed of an engine and the engine throttle positions.

A further object of the invention is to provide means for detecting variations of the rate of change in speed of a driving means from a desired rate and for varying engagement of a torque transmitting means to maintain this desired rate.

A more specific object of this invention is to provide regulating means for controlling the rate of engagement of a torque transmitting means in accordance with variations between a pressure that is proportional to engine throttle openings and which decreases at a predetermined rate and a pressure that is proportional to engine speed.

In carrying out the invention, a torque transmitting means is engaged at a predetermined rate as determined by a hydraulic system. This system includes a regulating means that is controlled by the opposing pressures, one a governor pressure, which is proportional to engine speed, and the other a throttle pressure, which is proportional to engine throttle openings. Throttle pressure fluid is stored in a reservoir which, during engagement of the torque transmitting means, is relieved by a pressure element continuously to provide a decreasing throttle pressure for opposing the governor pressure. Hence, a control rate is established by this steadily decreasing pressure that, if engine speed and accordingly governor pressure decrease at the same rate, will result in a smooth engagement of the torque transmitting means by maintaining a predetermined apply pressure during engagement. For example, if the engine speed is decreasing at the proper rate during engagement of the torque transmitting means, then the relationship between this decreasing pressure and the governor pressure will maintain the desired rate of engagement. However, if the torque transmitting means engagement were too rapid, then governor pressure would decrease and permit the decreasing pressure to decrease clutch apply pressure supplied by the regulator valve and slow-up engagement. Therefore, it can be seen that the effect of the decreasing pressure is to establish a standard for correlating engine speed and the rate of engagement of the torque transmitting means.

The foregoing and other objects and advantages will be apparent from the following description and from the accompanying drawing, in which an embodiment of the invention is shown diagrammatically.

As demonstrated by the drawing, the invention is incorporated in a transmission having a planetary gear set 10 which includes a plurality of planet pinions 12 in meshing engagement with an input sun gear 14 and a reaction ring gear 16. These planet pinions 12 are rotatably mounted on an output carrier 18 which transfers drive to some driven means, such as the output shaft 19. Drive for the gear set is furnished to the input sun gear 14 by an engine 20. When a reduced drive ratio is preferred, a suitable band or brake 22 engages and holds the reaction ring gear 16 against rotation. If it is desired to lock-up the gear set and to provide a direct drive therethrough, a torque transmitting means, e.g., multiplate clutch 24, disposed between the ring gear 16 and the output carrier 18, is employed. Engagement and disengagement of this clutch 24 is effected by pressure actuation of a clutch apply piston 26 slidably mounted in a chamber 28.

Fluid pressure for engaging the clutch 24 and for the system is derived from a suitable pump 30 which pumps pressure fluid from a sump 32 through a pump suction conduit 34 and a pump discharge conduit 36 to a conventional pressure regulator valve 38. This pressure regulator valve 38 operates in a well-known manner for regulating fluid pressure supplied to the system. From the pressure regulator valve pressure fluid proceeds through a front governor supply conduit 40 to an engine driven front governor 42 and through a rear governor supply conduit 44 to a rear governor 46 driven by the output shaft 19. Each of these governors are preferably of the hydraulic type, shown in the patent to Thompson 2,204,872, with the front governor 42 providing an engine speed conscious pressure and the rear governor 46 providing a vehicle speed conscious pressure. Another supply conduit 48 supplies pressure fluid to a shift valve 50 and a throttle valve 52.

In establishing a desired rate of engagement, a pressure proportional to throttle positions is employed as a standard; that is, a throttle pressure is utilized which is decreased steadily to establish a satisfactory rate of change for both engine speed and clutch engagement. Throttle pressure is desirable for this function, inasmuch as it is indicative of engine torque; for example, with a relatively wide open throttle, the throttle pressure will be considerably greater, as will the engine torque, than with a closed throttle.

To obtain throttle pressure a throttle actuated means, as throttle valve 52 and a conventional accelerator pedal 54, which pedal operates the engine throttle in a well-known manner, are utilized. The throttle valve 52 includes a valve body 56 with an elongated bore which has slidable therein at one end a throttle valve member 58 and at the other end a throttle actuated member 60 connected to the accelerator pedal 54 by suitable linkage. A control spring 62 is positioned intermediate these two members 58 and 60 for urging them apart. The throttle valve member 58 includes a control land 64 adjacent supply conduit 48 and a control land 66 adjacent an exhaust passage 67. An exhaust passage 68 relieves the area around the spring 62 of leakage fluid. Pressure fluid is transferred from a regulating chamber 69 between the lands 64 and 66 by a throttle pressure supply conduit 70 to the shift valve 50 and by a branch 72 to a control chamber 74. During operation, pressure in the regulating chamber 69 is regulated in a known manner as determined by accelerator pedal positions and by the effect of pressure in the control chamber 74. If the throttle opening is increased, then throttle pressure will be increased proportionately. Similarly, if the throttle opening is decreased, the throttle pressure will decrease. When the throttle setting is increased, the spring 62 is compressed tending to open the supply conduit 48 wider. As a result, a greater pressure develops in the regulating chamber.

Passage of throttle pressure fluid between the shift valve 50 and a reservoir or accumulator 80 through an accumulator supply conduit 77 is restricted in one direction, i.e., from the accumulator 80 to the shift valve 50, by a relief element or bleed off valve 78. This bleed off valve 78 includes a body 82 with an elongated chamber 84 in which is disposed a resilient spring member 86 pivotally attached at one end to the body 82. An orifice 88 is disposed in the spring member 86 in the path of communication of the conduit 77 through the body 82. The orifice 88 will limit the flow of fluid from the accumulator 80 to the shift valve 50, whereas the spring member 86 will permit relatively unrestricted flow from the shift valve 50 to the accumulator 80.

To have a ready source of throttle pressure which is decreased at some predetermined rate determined by the orifice 88 of the bleed off valve 78, the accumulator 80 is utilized. This accumulator includes a step diameter piston 90 slidable in a cylinder 91 with a pair of control springs 92 and 94 urging the piston 90 to the position illustrated. Sealing rings 96 and 98 impede leakage of fluid between chambers of the piston and an exhaust passage 100 is provided at the extreme back end of the accumulator for draining leakage fluid which gets by the rings 96 and 98 during operation. Pressure fluid from the accumulator supply conduit 77, when of sufficient pressure, moves the piston 90 upwardly compressing the springs 92 and 94 and filling the chamber provided. The strength of the springs 92 and 94 and the pressure of the fluid in conduit 70 determines the volume of the chamber to be filled. An accumulator discharge conduit 104 transfers pressure fluid from the accumulator 80 to a regulating means, as clutch regulator valve 102.

For initiating engagement of the clutch 24 at a predetermined vehicle speed, the shift valve 50 is employed and includes a governor plug 106, a shift valve member 108, and a shift spring 110, all slidably disposed in the bore of a shift valve body 112. The governor plug 106 is aligned with and abuts the shift valve member 108 with both being moved to the downshift position shown by the shift spring 110 in opposition to an opposing force on the plug 106 from governor pressure supplied by the rear governor 46 through a rear governor conduit 114. The shift valve member 108 comprises control lands 116, 118 and 120 with an interconnecting stem 122 between lands 116 and 118 and a stem 124 between lands 118 and 120. An exhaust passage 126 drains leakage fluid from between the ends of plug 106 and member 108.

In the downshift position of the valve member 108, throttle pressure fluid in conduit 70 from the throttle valve 52 proceeds around the stem portion 122 through conduit 77 to the accumulator 80 and the clutch regulator valve 102; meanwhile, pressure fluid in the supply conduit 48 is cut-off by the land 120. A clutch regulator valve supply passage 128 is opened by the stem 124 to an exhaust passage 130.

In the upshift position of the valve member 108 which is to the right of that shown, the land 116 cuts-off communication between the conduits 70 and 77. The supply conduit 48 is then opened by the land 120 to the clutch regulator valve supply conduit 128. The land 118 closes communication between the exhaust passage 130 and conduit 128 and opens the conduit 77 from the accumulator 80 to this exhaust passage 130.

Therefore, the shift valve 50 performs two functions; one, as a relay for supplying throttle pressure fluid to the accumulator 80 in the downshift position and interrupting supply in the upshift position and the other as a shift valve to interrupt supply of pressure fluid to the clutch regulator valve 102 in the downshift position and to supply pressure fluid to this valve in the upshift position.

To regulate clutch apply pressure, the clutch regulator valve 102 is employed and controls the pressure of fluid supplied to the piston 26 of the clutch 24 through a clutch apply conduit 132 from the clutch regulator valve supply conduit 128. The clutch regulator valve 102 has a regulator valve body 134 with a bore in which a spool type regulator valve member 136 is slidably disposed with aligned coacting end valve elements 138 and 140. The end valve element 138 is subjected at one end to front governor pressure received from the front governor 42 through a front governor conduit 142 and the end valve element 140 is subjected to pressure in the accumulator discharge conduit 104 from the accumulator 80. An exhaust passage 144 drains leakage fluid in the area between the end of the valve element 138 and the valve member 136 and the exhaust passage 146 drains the corresponding area between the valve element 140 and the valve member 136. To acquire regulation, a control exhaust port 148 is provided which coacts with a land 150 of the clutch regulator valve member 136. An opposite land 152 controls the inlet of pressure fluid from the conduit 128 with a relieved portion 154 interconnecting these lands 150 and 152. In the position of the regulator valve element 136 demonstrated, the valve is regulating between the conduit 128 and the control exhaust passage 148 to supply a regulated pressure to the clutch 24 through the clutch apply conduit 132, subject, of course, to the opposing forces from the pressures from the front governor 42 and from the accumulator 80.

In operation, with the vehicle operating at some speed in which the shift valve 50 is in the downshifted position, a throttle pressure will be provided by the throttle valve 52 of a value determined by the position of the accelerator pedal 54 as previously described. This throttle pressure is supplied by the conduit 70 through the opening provided by the stem 122 of the shift valve member 108 and by the conduit 77 to the accumulator 80 through the bleed-off valve 78. At this time the throttle pressure will be sufficient to move the spring 86 of the bleed-off valve 78 outwardly, hence permitting unimpeded flow of fluid through this valve 78. The accumulator 80 then will be charged with the piston 90 being moved upwardly and pressure fluid will be supplied via conduit 104 to the end valve element 140 of the clutch regulator valve 102. On the opposite end valve element 138, governor pressure from the front governor 42 will be acting. However, since the shift valve 50 is in the downshifted position, the supply conduit 48 is cut-off and pressure fluid in the conduit 128 is drained to the exhaust passage 130 in the shift valve 50.

Upon attainment of a predetermined vehicle speed, the pressure developed by the rear governor 46 will be sufficient to move the shift valve 50 to the upshifted position. At this time, the supply of throttle pressure to the accumulator is cut-off by the shift valve 50 and the supply of pressure fluid from the pump is started to the clutch regulator valve 102. The accumulator 80, through the conduit 77, is in communication with the exhaust passage 130 since the valve land 118 will have been moved past this passage closing off the conduit 128 to this passage 130. The spring element 86 of the bleed-off valve 78 closes and then the orifice 88 becomes effective to limit the decrease of pressure in the accumulator to a rate determined by the size of this orifice 88. This rate of pressure decrease will correspond to the desired rate of engine speed decrease. As pressure fluid is steadily bled to the exhaust passage 130, the pressure in the conduit 104 will similarly steadily decrease at this fixed rate diminishing the effective control of this pressure on the clutch regulator valve. The clutch regulator valve 102, as has been explained, regulates the pressure in the conduit 128 in accordance with this decreasing pressure and the governor pressure from the front governor 42 to provide a smooth clutch engagement. For example, if the clutch engaging action is too abrupt for this system as pre-set, engine speed and hence governor pressure will decrease faster than the decreasing pressure in the conduit 104. The decreasing pressure will then decrease clutch apply pressure by causing valve element 136 to open the conduit 132 to the exhaust passage 148 slowing up clutch engagement. Engine speed then will build up and increased governor pressure will move the valve element 136 of the clutch regulator valve 102 back to a position in which clutch apply pressure is increased. This cycle of events continuously occurs in maintaining the speed changes of the engine according to the rate determined by the decreasing throttle pressure in the conduit 104. If the rate of decrease of this throttle pressure is changed by altering the orifice 88 then, of course, the engine speed rate will be altered accordingly.

It is significant that in employing throttle pressure with the throttle relatively wide open, the accumulator 80 will be charged with a greater pressure and, as a result, the clutch regulator valve will regulate at a higher pressure although at the same rate because the orifice 88 will have not been changed. This results in a higher clutch apply pressure which is desirable since the clutch would be subjected to greater torques with wider throttle openings. Similarly, at low speeds and low throttle openings, the throttle pressure will be less and consequently, the clutch apply pressure will not be as high. A feature which is helpful in maintaining smooth shifts at low vehicle speeds.

I claim:

1. In a transmission, the combination comprising, engageable and disengageable torque transmitting means for transferring drive between driving and driven members, means for engaging said torque transmitting means, regulating means for regulating said engaging means, and hydraulic control means for supplying a governor pressure proportional to the speed of the driving member and a continuously decreasing pressure, both pressures being operative to control said pressure regulating means to provide a controlled rate of engagement of said torque transmitting means in accordance with the speed of the driving member established by the continuously decreasing pressure.

2. In a transmission for a motor vehicle having an engine with a throttle, the combination comprising, engageable and disengageable torque transmitting means for transferring drive between said engine and a driven means, means for engaging said torque transmitting means, regulating means for regulating said engaging means, and control means including a governor driven at the speed of the engine to influence said regulating means, and a throttle actuated means for providing a decreasing influence at a predetermined rate for opposing the effect of said governor on said regulating means to provide a controlled rate of engagement of said torque transmitting means in accordance with said predetermined rate.

3. In a transmission, the combination comprising, engageable and disengageable torque transmitting means for transferring drive between driving and driven members, fluid pressure operated means for engaging said torque transmitting means, a source of fluid pressure, a regulator valve for controlling fluid pressure supplied by said source to said fluid pressure operative means, a governor responsive to changes in speed of said driving member and adapted to develop a governor pressure for moving said regulator valve in one direction, and means for developing a decreasing counteracting pressure that decreases at a predetermined rate for opposing the effect of said governor pressure and said regulator valve, said governor pressure and said counteracting pressure together rendering said regulator valve effective to control the rate of engagement of said torque transmitting means in accordance with both the speed of the driving member and a desired rate of engagement established by the predetermined rate at which the counteracting pressure decreases.

4. In a transmission, the combination comprising, engageable and disengageable torque transmitting means for transferring drive between driving and driven members, fluid pressure operated means for engaging said torque transmitting means, a source of fluid pressure for said fluid pressure operated means, a regulator valve for controlling fluid pressure supplied to said fluid pressure operated means, a governor responsive to changes in speed of said driving member and adapted to develop a governor pressure for acting on said regulator valve, a source of counteracting pressure for opposing the effect of the governor pressure on said regulator valve, and means for continuously decreasing said counteracting pressure at a predetermined rate, said counteracting pressure and said governor pressure together rendering said regulator valve effective to control the rate of engagement of said torque transmitting means in accordance with both the speed of said driving member and a desired rate of engagement established by the continuously decreasing counteracting pressure.

5. In a transmission having an engine with a throttle, the combination comprising, engageable and disengageable torque transmitting means for transferring drive between said engine and a driven means, fluid pressure operated means for engaging said torque transmitting means, a source of fluid pressure for said fluid pressure operated means, a regulator valve for controlling fluid pressure supplied to said fluid pressure operated means, a governor responsive to changes in speed of said engine and adapted to develop a governor pressure for acting on said regulator valve, a throttle actuated means for developing a throttle pressure proportional to throttle openings for opposing the effect of said governor pressure on said regulator valve, and means for continuously decreasing said throttle pressure at a predetermined rate, said decreasing throttle pressure and said governor pressure together rendering said regulator valve effective to control the rate of engagement of said torque transmitting means in accordance with both the speed of the engine and the rate established by said decreasing throttle pressure.

6. In a transmission, the combination comprising, engageable and disengageable torque transmitting means for transferring drive between driving and driven members, fluid pressure operated means for engaging said torque transmitting means, a source of pressure fluid for said pressure operative means, a regulator valve for controlling pressure fluid supplied to said pressure fluid operative means, a governor responsive to changes in speed of said driving member and adapted to develop a governor pressure for acting on said regulator valve, a reservoir of pressure fluid associated with said regulator valve to provide a counteracting pressure for opposing the effect of governor pressure on said regulator valve, and a relief element for continuously decreasing said counteracting pressure in said reservoir, said counteracting pressure and said governor pressure together rendering said regulator valve effective to control the rate of engagement of said torque transmitting means in accordance with the speed of the driving member and a desired rate.

7. In a transmission, the combination comprising; a prime mover; an output; a step ratio torque transmitting mechanism disposed between said prime mover and said output; a fluid pressure operated friction engaging device for establishing a ratio of torque transmission by said mechanism; valve means for regulating pressure fluid supplied to said friction engaging device; and fluid control means including a source of governor pressure proportional to the speed of the prime mover, and a source of pressure decreasing at a predetermined rate to establish a desired rate of change standard for the prime mover; said governor pressure and said decreasing pressure coacting on said valve means to vary the engagement of said friction engaging device by varying the pressure fluid supplied thereto for maintaining the rate of change in speed of the prime mover during engagement in accordance with the desired standard rate of change.

8. In a transmission for a vehicle having a throttle, the combination comprising; a prime mover; an output; a step ratio torque transmitting mechanism disposed between said prime mover and said output; a fluid pressure operated friction engaging device for establishing a ratio of torque transmission by said mechanism; valve means for regulating fluid pressure supplied to said friction engaging device; and control means including a governor responsive to the speed of the prime mover, and a throttle actuated means for establishing a desired rate of change standard for the prime mover; said governor and said throttle actuated means coacting with said valve means to vary engagement of said friction engaging device to maintain the rate of change in prime mover speed during engagement in accordance with the desired rate of change standard.

9. In a transmission for a vehicle having a throttle, the combination comprising, a prime mover, an output, a step ratio torque transmitting mechanism disposed between said prime mover and said output, a fluid pressure operated friction engaging device for establishing a ratio of torque transmission by said mechanism, a regulator valve for controlling pressure fluid supplied to said friction engaging device, a governor responsive to changes in speed of the prime mover for developing a governor pressure for acting on said regulator valve, a throttle actuated valve means for establishing a throttle pressure proportional to throttle openings, an accumulator connected between said throttle actuated valve means and said regulator valve, means for supplying throttle pressure fluid to said accumulator when said friction engaging device is disengaged and for interrupting supply of throttle pressure fluid to said accumulator when engagement of said friction engaging device is initiated, a pressure relief element for continuously decreasing throttle pressure fluid in said accumulator during engagement of said friction engaging device to provide a rate of change standard for changes in prime mover speeds, said decreasing pressure and said governor pressure controlling said regulator valve to vary the rate of engagement of said friction engaging device to maintain the rate of change in engine speed in accordance with the rate of change standard established by said decreasing throttle pressure fluid.

10. A pressure control device comprising, a source of control presure for establishing a rate of change in pressure standard, a source of varying pressure, and pressure regulating means communicating with both said source of control presure and said source of varying pressure, said pressure regulating means being so arranged as to develop a pressure reflective of deviations in the rate of change of said varying pressure from the rate of change standard established by said control pressure.

11. A pressure control device comprising, a source of control pressure, a reservoir communicating with the control pressure source and adapted to accumulate said control pressure, a pressure control means in communication with the reservoir and arranged so as to vary said control pressure in said reservoir at a predetermined rate to establish a rate of change standard, a source of varying pressure, and pressure regulating means communicating with both said reservoir and said varying pressure source, said pressure regulating means being so arranged as to develop a pressure reflective of deviations in the rate of change of said varying pressure from the rate of change standard established by said pressure control means.

12. A pressure control device comprising, a source of control pressure, an accumulator communicating with said control pressure source and adapted to store said control pressure, a pressure relief means in communication with said accumulator and arranged so as to decrease said control pressure in said accumulator at a predetermined rate to establish a rate of change standard, a source of varying pressure, and pressure regulating means communicating with both said accumulator and said varying pressure source, said pressure regulating means being so arranged as to develop a pressure reflective of deviations in the rate of change of said varying pressure from the rate of change standard established by said pressure control means.

13. In a transmission, the combination comprising engageable and disengageable torque transmitting means for transferring drive between driving and driven members, means for engaging said torque transmitting means, and fluid controlled means for regulating said engaging means and including a governor driven at a speed corresponding to the speed of one of the members and fluid means establishing a rate standard corresponding to a predetermined desired rate of change in the speed of said one member, the governor and the fluid means together causing the fluid controlled means to provide a controlled rate of engagement of the torque transmitting means in accordance with deviations in the actual rate of change in the speed of said one member determined by the governor from the predetermined rate standard established by the fluid means.

14. In a transmission for a motor vehicle having an engine with a throttle, the combination comprising engageable and disengageable torque transmitting means for transferring drive between said engine and a driven means, means for engaging said torque transmitting means, and means controlling said engaging means including a governor driven at a speed corresponding to the speed of the engine and means establishing a rate standard corresponding to a predetermined desired rate of change in the speed of the driving member, the governor and the rate standard establishing means together causing the controlling means to provide a controlled rate of engagement of the torque transmitting means in accordance with both the speed of the engine determined by the governor and throttle positions and the predetermined rate established by the rate standard establishing means.

15. In a transmission, the combination comprising engageable and disengageable torque transmitting means for transferring drive between driving and driven members, means for engaging said torque transmitting means, regulating means for regulating said engaging means, and fluid controlled means for controlling said regulating means including a governor driven at a speed corresponding to the speed of the driving member and fluid means establishing a rate standard corresponding to a predetermined desired rate of change in the speed of the driving member, the governor and the fluid means together causing the fluid controlled means to provide a controlled rate of engagement of the torque transmitting means in accordance with deviations in the actual rate of change in speed of the driving member determined by the governor from the predetermined rate standard established by the fluid means.

16. In a transmission, the combination comprising engageable and disengageable torque transmitting means for transferring drive between driving and driven members, a source of fluid pressure, pressure regulating means for varying said fluid pressure, means operated by the regulated fluid pressure for engaging said torque transmitting means, and fluid controlled means for controlling said pressure regulating means comprising a governor driven by said driving member and a source of continuously decreasing pressure that decreases at a predetermined rate, said governor and said continuously decreasing pressure together effecting a controlled rate of engagement of said torque transmitting means in accordance with the speed of the driving member and a desired rate of engagement established by the predetermined rate at which the continuously decreasing pressure decreases.

References Cited in the file of this patent

UNITED STATES PATENTS

| | | |
|---|---|---|
| 1,967,730 | Zadig | July 24, 1934 |
| 2,118,123 | Watts | May 24, 1938 |
| 2,765,893 | Stuart | Oct. 9, 1956 |
| 2,800,143 | Keller | July 23, 1957 |